No. 622,943. Patented Apr. 11, 1899.
J. H. & P. M. DYSART.
ACETYLENE GAS GENERATOR.
(Application filed May 25, 1898.)
(No Model.)
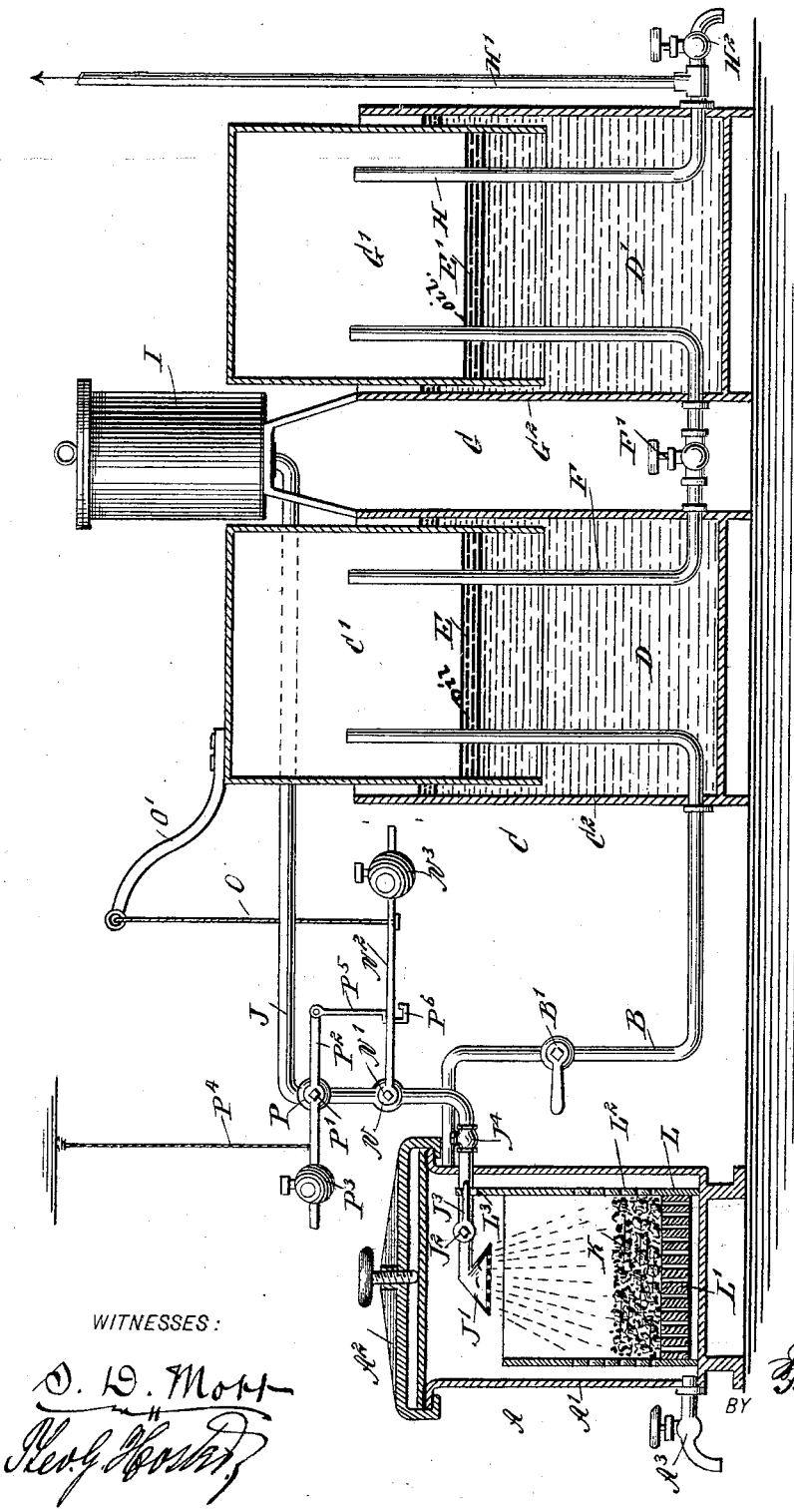
WITNESSES:
INVENTORS
J. H. Dysart
P. M. Dysart
BY
ATTORNEYS.

UNITED STATES PATENT OFFICE.

JAMES H. DYSART, OF ALEXANDRIA, AND PAUL MOORE DYSART, OF PITTSBURG, PENNSYLVANIA.

ACETYLENE-GAS GENERATOR.

SPECIFICATION forming part of Letters Patent No. 622,943, dated April 11, 1899.

Application filed May 25, 1898. Serial No. 681,671. (No model.)

*To all whom it may concern:*

Be it known that we, JAMES H. DYSART, of Alexandria, in the county of Huntington, and PAUL MOORE DYSART, of Pittsburg, in the county of Allegheny, State of Pennsylvania, have invented a new and Improved Acetylene-Gas Generator, of which the following is a full, clear, and exact description.

The object of the invention is to provide a new and improved acetylene-gas generator arranged to generate gas in a very simple and economical manner and in amounts sufficient to supply the burners and to automatically shut off the water-supply from the generator in case the calcium carbid has been used up.

The invention consists of novel features and parts and combinations of the same, as will be fully described hereinafter and then pointed out in the claims.

Reference is to be had to the accompanying drawing, forming a part of this specification, in which the figure is a sectional side elevation of the improvement.

The improved acetylene-gas generator is provided with a generator A proper connected by a pipe B with the interior of the gasometer-bell C' of a gasometer C, having the usual tank C², partly filled with water D, on the top of which floats a layer of oil E for preventing the water from evaporating and mixing with the acetylene gas stored in said bell and for preventing the absorption of the gas by the water. The interior of the bell is connected by a pipe F, having a valve F', with the interior of a second gasometer-bell G' of a gasometer G, likewise provided with the usual tank G², containing water D' and a layer of oil E' for the same purpose as the oil E. A stand-pipe H leads from the gasometer-bell G' through the side of the tank G² to the outside thereof to connect with a supply-pipe H' for carrying the gas to the burners. A drip-cock H² is also connected with the lower end of the pipe H for drawing off any water that may accumulate in the pipes H H'.

On a suitable bracket carried by the tanks C² G² is supported a water-tank I, connected at its bottom with a pipe J, leading into the casing A' of the generator A, and formed at its inner end with a sprinkler J' for distributing the water in small jets upon the carbid K, contained in a carbid-holder L, having a wooden perforated bottom L' and perforations L² in its sides to permit the water to pass from the holder into the casing A to cause the said holder to rise and fall in the accumulating water and actuate a valve J², contained in the pipe J within the casing A'. For this purpose the valve J² is provided on its valve-stem with an arm J³, engaged by a projection L³ on the holder L, so that when the latter floats upward the valve J² is turned into a closed position to shut off the water from the generator at the time the calcium carbid K has been used up and no gas is generated.

The casing A' is provided with a removable cover A² for giving access to the interior of the casing, and a cock A³ is attached to the lower end of the casing for draining the latter of the slaked lime and water whenever it is desired to clean the casing and refill the holder with calcium carbid.

In the pipe J, outside of the generator J', is arranged a valve N, having its valve-stem N' provided with an arm N², carrying a weight N³, the arm being also connected with one end of a rope O, extending upwardly and secured to a bracket O', attached to the gasometer-bell C'.

Now it is evident that when the bells C' G' are in a normal position the valve N is closed, and when the burners connected with the pipe H' are lighted and gas is withdrawn from said bells then the latter sink and in doing so allow the arm N² to swing down by its weight to open the valve N and to permit water to flow from the tank I to the carbid K, so that the gas is generated and delivered through the pipe B into the bell C' and from the latter by the pipe F into the bell G'. The bells thus rise, and the arm N² moves back to its former normal position by the action of the rope O and closes the valve N to shut off the water from the calcium carbid.

In case the calcium carbid K is exhausted and gas is no longer generated then the descent of the bells C' and G' is not checked by newly-generated gas, and in order to now shut off the water-supply automatically a valve P is provided, carrying on its valve-stem P' a lever P², supporting at one end a weight P³, normally held in place by a fixed rope P⁴, and at the other end a link P⁵, formed at its lower end into a hook P⁶, adapted to be engaged by the arm N² when the bells C' and G' move into a lowermost position. When this takes place, the weight N³ of the arm N² overbalances the weight P³, and as the arm N² is free to swing downward and now engages the hook P⁶ it imparts a swinging motion to the lever P² to close the valve P.

The pipe B is provided with a valve B' for disconnecting the interior of the casing A' from the bell C' whenever it is desired to recharge the generator A with fresh calcium carbid. The pipe J is also provided with a check-valve J⁴ for preventing gas from flowing from the casing A' into the water-tank I in case the latter has run dry.

It is understood that the apparatus can be used for the production of any gas generated by the union of a fluid with a solid.

Having thus fully described our invention, we claim as new and desire to secure by Letters Patent—

1. An acetylene-gas generator, comprising a gasometer, a gas-generator connected with the interior of the gasometer and provided with a floatable holder adapted to contain the carbid, a water-supply pipe for delivering water to the carbid, a valve in said pipe and controlled by the bell of the gasometer, to regulate the amount of water flowing through the supply-pipe to the calcium carbid, and a shut-off valve within the generator and controlled by the floatable carbid-holder, substantially as shown and described.

2. An acetylene-gas generator, provided with a generator-casing, a floatable carbid-holder in said casing, a water-supply pipe for delivering water to the carbid in the holder, and a valve in said pipe and controlled by said floatable carbid-holder, substantially as shown and described.

3. An acetylene-gas generator, comprising a gasometer, a gas-generator connected with the interior of the gasometer, and provided with a holder for containing the carbid, a water-supply pipe for delivering water to the carbid, a valve in said pipe and controlled by the bell of the gasometer, to regulate the amount of water flowing through the supply-pipe to the calcium carbid, and a second valve in said pipe and controlled from the first-named valve, to shut off the water in said supply-pipe in case the calcium carbid is exhausted.

JAMES H. DYSART.
PAUL MOORE DYSART.

Witnesses to the signature of James H. Dysart:
F. A. JOY,
H. A. JOY.

Witnesses to the signature of Paul M. Dysart:
D. H. LOVELL,
J. D. LOVELL.